United States Patent
Disteldorf et al.

(10) Patent No.: US 8,677,782 B2
(45) Date of Patent: Mar. 25, 2014

(54) METHOD OF MAKING GLASS INCLUDING SURFACE TREATMENT WITH ALUMINUM CHLORIDE AT OR JUST PRIOR TO ANNEALING LEHR

(75) Inventors: Bernd Disteldorf, Mettlach (DE); Willem den Boer, Brighton, MI (US)

(73) Assignees: Guardian Industries Corp., Auburn Hills, MI (US); Centre Luxembourg de Recherches pour le Verre er la Ceramique S.A. (C.R.V.C.), Grand Duche de Luxembourg (LU)

( * ) Notice: Subject to any disclaimer, the term of this patent is extended or adjusted under 35 U.S.C. 154(b) by 1135 days.

(21) Appl. No.: 11/878,318

(22) Filed: Jul. 23, 2007

(65) Prior Publication Data
US 2008/0022723 A1 Jan. 31, 2008

Related U.S. Application Data

(63) Continuation-in-part of application No. 11/492,204, filed on Jul. 25, 2006, now abandoned.

(51) Int. Cl.
C03C 17/09 (2006.01)

(52) U.S. Cl.
USPC .................. 65/30.1; 65/30.14; 65/90

(58) Field of Classification Search
None
See application file for complete search history.

(56) References Cited

U.S. PATENT DOCUMENTS

| | | | |
|---|---|---|---|
| 3,827,871 A | 8/1974 | Budd | |
| 3,880,633 A * | 4/1975 | Jordan et al. | 65/60.2 |
| 4,022,601 A | 5/1977 | Sopko | |
| 4,853,257 A * | 8/1989 | Henery | 427/166 |
| 4,859,636 A * | 8/1989 | Aratani et al. | 501/72 |
| 5,054,355 A | 10/1991 | Tisse et al. | |
| 5,217,753 A * | 6/1993 | Goodman et al. | 427/166 |
| 5,510,144 A | 4/1996 | Cordie | |
| 5,780,371 A * | 7/1998 | Rifqi et al. | 501/67 |
| 5,782,949 A | 7/1998 | Marique et al. | |
| 5,948,132 A | 9/1999 | Maltby, Jr. et al. | |
| 6,114,039 A * | 9/2000 | Rifqi | 428/410 |

(Continued)

FOREIGN PATENT DOCUMENTS

| EP | 1 917 121 B1 | 7/2006 |
|---|---|---|
| GB | 852 270 | 10/1960 |

(Continued)

OTHER PUBLICATIONS

U.S. Appl. No. 11/492,204, filed Jul. 25, 2006.

(Continued)

*Primary Examiner* — Jodi C Franklin
(74) *Attorney, Agent, or Firm* — Nixon & Vanderhye P.C.

(57) ABSTRACT

This invention relates to a method of making glass. In certain example embodiments, a major surface(s) of the glass is treated with aluminum chloride (e.g., $AlCl_3$) at or just prior to the annealing lehr. The aluminum chloride treatment at or just prior to the annealing lehr, in either a float or patterned line glass making process, is advantageous in that it allows the treatment to be performed at a desirable glass temperature and permits exhaust functions in or proximate the annealing lehr to remove byproducts of the treatment in an efficient manner. In certain example embodiments, the glass may be polished for thinning after the treatment, with the polishing being performed on a major surface of the glass opposite to a major surface which has been treated with aluminum chloride.

9 Claims, 2 Drawing Sheets

(56) References Cited

U.S. PATENT DOCUMENTS

| | | | |
|---|---|---|---|
| 6,602,371 | B2 | 8/2003 | Veerasamy |
| 6,711,917 | B2 | 3/2004 | Landa et al. |
| 6,713,178 | B2 | 3/2004 | Veerasamy |
| 6,716,780 | B2 | 4/2004 | Landa et al. |
| 6,796,146 | B2 | 9/2004 | Burnham |
| 6,853,433 | B2 | 2/2005 | Kim et al. |
| 6,949,484 | B2 | 9/2005 | Landa et al. |
| 6,953,759 | B2 | 10/2005 | Landa et al. |
| 7,087,307 | B2 * | 8/2006 | Nagashima et al. ........... 428/432 |
| 7,325,417 | B2 * | 2/2008 | Landa et al. ................. 65/29.16 |
| 2002/0059811 | A1 * | 5/2002 | Landa et al. ...................... 65/45 |
| 2003/0037569 | A1 * | 2/2003 | Arbab et al. ...................... 65/22 |
| 2003/0039843 | A1 * | 2/2003 | Johnson et al. ............... 428/432 |
| 2004/0142811 | A1 * | 7/2004 | Torr et al. ....................... 501/70 |
| 2004/0221615 | A1 * | 11/2004 | Postupack et al. ........... 65/30.14 |
| 2005/0117438 | A1 * | 6/2005 | Ikenishi et al. ................ 365/232 |
| 2005/0284179 | A1 * | 12/2005 | Isono et al. .................. 65/30.14 |
| 2007/0141349 | A1 | 6/2007 | Hessenkemper et al. ..... 428/410 |

FOREIGN PATENT DOCUMENTS

| | | |
|---|---|---|
| JP | 60-176952 | 9/1985 |
| JP | 11-228172 | 8/1999 |
| RU | 2 116 983 | 8/1998 |
| SU | 140966 | 1/1961 |
| SU | 988787 | 1/1983 |
| SU | 990708 | 1/1983 |
| SU | 1392043 A1 | 4/1988 |
| WO | WO 97/29058 | 8/1997 |
| WO | WO 2004/096724 | 11/2004 |
| WO | WO 2007/014732 A2 | 2/2007 |

OTHER PUBLICATIONS

Mexican Office Action dated Dec. 12, 2012.
Russian Decision on Grant dated Jul. 25, 2011.
Russian Office Action dated May 3, 2011.
Pavlushkin N.M. Khimicheskaya Teknologiya Stekla I Sitallov (Chemical Technology for Glass and Glass Ceramics), Moscow, Stroyizdat, 1983 (II), pp. 232-237.
Taiwan Search Report dated Jul. 16, 2013.

* cited by examiner

METHOD OF MAKING GLASS INCLUDING SURFACE TREATMENT WITH ALUMINUM CHLORIDE AT OR JUST PRIOR TO ANNEALING LEHR

This is a continuation-in-part (CIP) of U.S. Ser. No. 11/492,204, filed Jul. 25, 2006, now abandoned the entire disclosure of which is hereby incorporated herein by reference.

This invention relates to a method of making soda-lime-silica based glass. In certain example embodiments of this invention, during the glass-making process, following the stage where the glass sheet is formed and floated on a molten material (e.g., tin bath), a major surface(s) of the glass is treated with aluminum chloride (e.g., $AlCl_3$) at or just prior to the annealing lehr. The aluminum chloride treatment in a patterned-line process (as opposed to a float process) may also be performed at or just prior to the annealing lehr. The aluminum chloride treatment at or just prior to the annealing lehr, in either a float or patterned line glass making process, is advantageous in that it allows the treatment to be performed at a desirable glass temperature and permits exhaust functions in or proximate the annealing lehr to remove byproducts of the treatment in an efficient manner. Such glasses made in this manner are useful, for example and without limitation, in glass window applications, solar cell applications, furniture glass applications, and/or display glass applications.

BACKGROUND OF THE INVENTION

In a conventional float line glass-making process, glass batch materials are heated in a furnace or melter to form a glass melt. The glass melt is poured onto a bath of molten material such as tin (tin bath), where the glass melt is formed and continuously cooled to form a float glass ribbon. The float glass ribbon is then forwarded to the annealing lehr for further processing and then may be cut to form solid glass articles, such as flat glass sheets. For float glass, the glass batch often includes soda, lime and silica to form soda-lime-silica based flat glass.

Unfortunately, conventional float glass (coated or uncoated) is susceptible to damage as a result alkalis such as sodium (Na) diffusing outwardly from the glass to the surface and possibly in coatings such as low-E coatings provided on the glass. On uncoated glass, the sodium upon reaching the surface may react with water or the like to produce visible stains or smears on the glass surface. Moreover, sodium diffusion into coatings on the glass can damage the coatings thereby leading to defected coated articles such as IG (insulating glass) window units, or other types of windows.

Most flat panel displays are built on expensive glass substrates such as vertically drawn fusion borosilicate glass or polished down borosilicate glass. This type of glass has low sodium (Na and/or $Na_2O$) content. However, the cost of the source material for borosilicate glass is much higher than that of conventional soda-lime-silica based float glass. But conventional float glass has a lower manufacturing cost, but higher sodium content. During high temperature processing typically used in display panel manufacturing (e.g., 200-600 degrees C.) and/or over the lifetime of the display, the sodium can diffuse from the float glass substrate and cause deterioration of the display performance. For example, in a-Si (amorphous silicon) TFT displays such as those used in TVs, monitors, cell phones and so forth, sodium migration into the TFT and/or display medium material can lead to significant degradation of the TFT(s) and/or display medium and therefore of display characteristics.

Another issue with conventional soda-lime-silica based float glass is a higher coefficient of thermal expansion (CTE) than borosilicate glass (8.5 vs. 3.7 ppm/° C.). In order to pattern films on display substrates, a low CTE is often desired.

Many flat panel displays use two glass substrates; for example, a TFT substrate and a color filter substrate, which both typically have to be of the same type of glass. The cost of the glass substrates in a finished display panel can be in the range of 10-20% of the overall panel costs in certain instances. On the other hand, the cost of conventional float glass may be more than an order of magnitude lower than that of borosilicate glass used in many flat panel display applications. There is a need in the art to reduce the cost of glass substrates for acceptable use in display applications, and thus the overall display cost.

It is known to treat the surface of glass with materials such as aluminum (e.g., see JP 60-176952, and WO 2004/096724 to Hessenkemper, both of which are hereby incorporated herein by reference). However, such treatments are not done in an efficient manner consistent with the float process.

In view of the above, it will be apparent that there exists a need in the art for a method of making flat glass, e.g., via either the float process or a patterned-line process, including a technique for treating the glass to make it more durable, in a more efficient manner.

SUMMARY OF EXAMPLE EMBODIMENTS OF THE INVENTION

This invention relates to a method of making soda-lime-silica based glass. The glass may be made using either a float process or a patterned-line process in different example embodiments of this invention. In certain example embodiments of this invention, the soda-lime-silica based glass comprises a base glass portion that includes: $SiO_2$ 67-75%, $Na_2O$ 10-20%, CaO 5-15%, $Al_2O_3$ 0-7%, MgO 0-7%, and $K_2O$ 0-7%. Optionally, the glass may further include one or more colorants such as iron, selenium, cobalt, erbium and/or the like.

In certain example embodiments of this invention, a soda-lime-silica based float glass substrate is modified to meet desires for display glass. In certain example instances, a surface of the soda-lime-silica based float glass is treated to prevent or greatly reduce diffusion of sodium into the display structure and devices.

In certain example embodiments of this invention, a major surface(s) of the glass is treated with aluminum chloride (e.g., $AlCl_3$) at or just prior to the annealing lehr. In the float process, the annealing lehr is located after the molten bath (e.g., tin bath), whereas in a patterning-line process the annealing lehr is located after the patterning roller(s) (i.e., the lehr is located soon after the glass forming stage). The aluminum chloride may be used in the form of a mixture including $AlCl_3$ provided in a solvent such as methanol or some other alcohol or the like. The aluminum chloride treatment at or just prior to the annealing lehr, in either a float or patterned line glass making process, is advantageous in that it allows the treatment to be performed at a desirable glass temperature, takes advantage of the excess oxygen present in the lehr which helps burn off the solvent(s), and permits exhaust functions in or proximate the annealing lehr to remove byproducts of the treatment in an efficient manner. Thus, additional exhaust steps following the lehr may be avoided in certain example non-limiting situations, as may aluminum treatment steps with corresponding heating following the lehr. Such glasses made in this manner are useful, for example and without limitation, in glass window applications, solar cell applications, furniture glass applications, glass for supporting thin film transistors (TFTs), and/or display glass applications.

In certain example embodiments, the glass is designed for use in flat panel displays such as PDPs, LCDs, and/or OLEDs. Sodium diffusion from the glass substrate is greatly reduced by the sodium-blocking surface treatment, thereby allowing for production of TFTs (e.g., a-Si TFTs, poly-Si TFTs, or the like) and/or other electronic devices on the glass substrate without significant deterioration of display characteristics. Glass according to certain example embodiments of this invention may be used in one or both substrates of certain display applications.

In certain example embodiments of this invention, there is provided a method of making soda-lime-silica based glass, the method comprising: providing glass raw materials in a furnace to form a glass melt; forwarding a glass strip formed from the melt to an annealing lehr where the glass strip is annealed; and treating at least one major surface of the glass strip with aluminum chloride, at or just prior to the annealing lehr, when the glass strip is at a temperature(s) of from about 540 degrees C. to 850 degrees C.

In other example embodiments of this invention, there is provided an apparatus for making soda-lime-silica based glass, the apparatus comprising: a furnace into which glass raw materials are introduced to form a glass melt; an annealing lehr where a glass strip formed from the glass melt is annealed; and means for treating at least one major surface of the glass strip with aluminum chloride, at or just prior to the annealing lehr, when the glass strip is at a temperature(s) of from about 580 degrees C. to 850 degrees C.

Glass described herein may be made in accordance with the glass thickness as produced on the float line. Alternatively, the glass may be polished down to a smaller thickness after the float process and thus after the aluminum chloride treatment for certain display applications. For example, a starting substrate with a thickness of about 1.6 mm may be polished down to about 0.6-1.2 mm (more preferably from about 0.7-1.1 mm) thickness for certain display applications. As another example, a glass substrate starting with a thickness of 1.1 mm may be polished down to a 0.7 m thickness. The post-treatment polishing is performed on the surface of the glass opposite the surface that was treated with the aluminum chloride, so as to not disturb the Al content at the treated surface of the glass.

DETAILED DESCRIPTION OF CERTAIN EXAMPLE EMBODIMENTS OF THIS INVENTION

Figure 1:
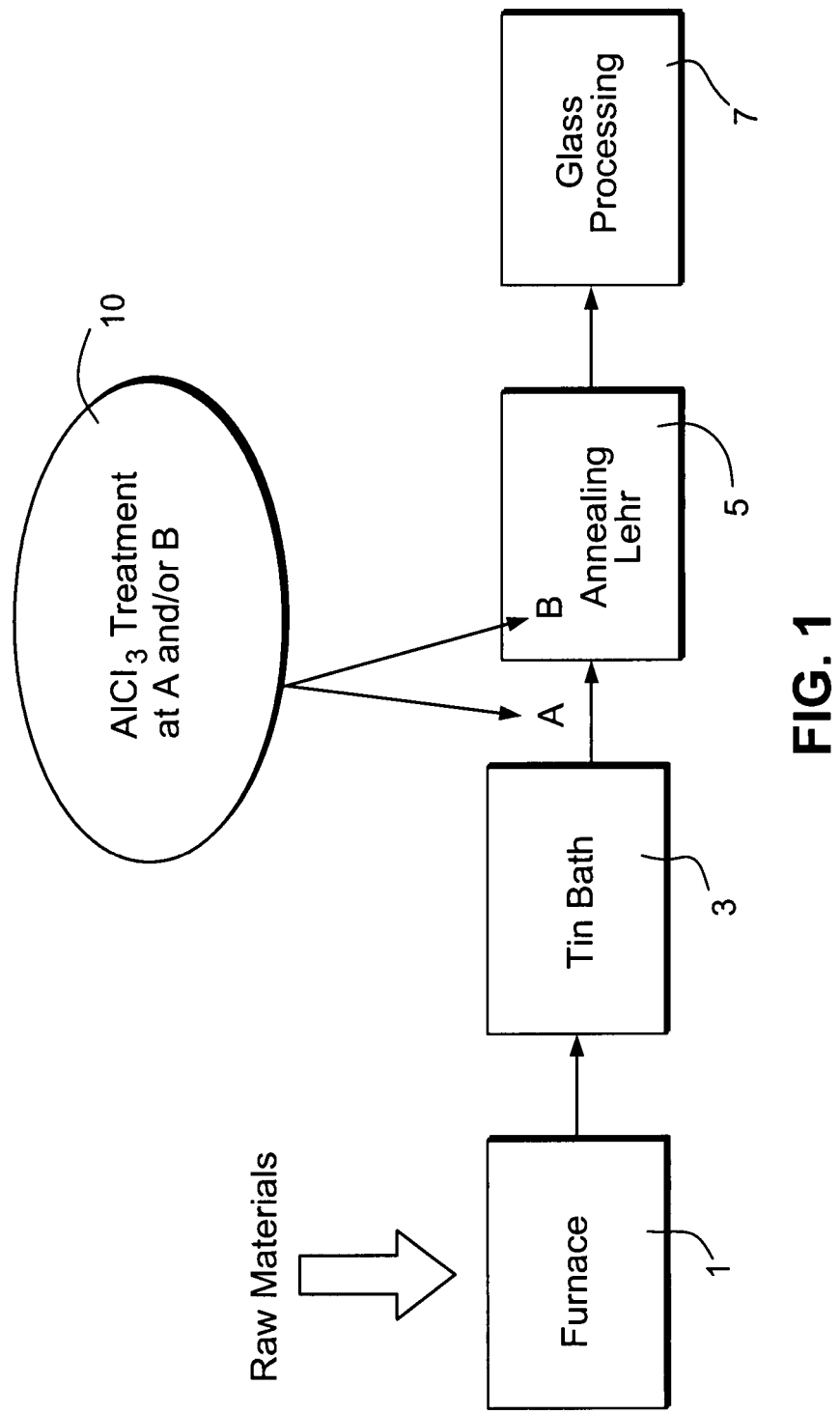
FIG. 1 is a schematic diagram illustrating a glass making process, using the float process, according to an example embodiment of this invention.

This invention relates to a method of making soda-lime-silica based glass, using one or both of a float process and/or a patterned-line process. In certain example embodiments of this invention, a major surface(s) of the glass is treated with aluminum chloride (e.g., $AlCl_3$) at or just prior to the annealing lehr. In the float process, the annealing lehr is located after the molten bath (e.g., tin bath) where the glass floats on the molten bath, whereas in a patterning-line process the annealing lehr is located after the patterning roller(s) which form patterns in one or both major surfaces of the glass (i.e., the lehr is located soon after the glass forming stage). The aluminum chloride treatment at or just prior to the annealing lehr is advantageous in that it allows the treatment to be performed at a desirable glass temperature, takes advantage of the excess oxygen present in the lehr which helps burn off the solvent(s) with which the aluminum chloride is mixed, and permits exhaust functions in or proximate the annealing lehr to remove byproducts of the treatment in an efficient manner. It is noted that the treatment may also be done in another gas atmosphere (e.g., a nitrogen based gas atmosphere). Thus, additional exhaust steps following the lehr may be avoided in certain example non-limiting situations, as may aluminum treatment steps with corresponding heating following the lehr.

In certain example embodiments, the glass is designed for use in flat panel displays such as PDPs, LCDs, and/or OLEDs. Sodium diffusion from the glass substrate is greatly reduced by the sodium-blocking surface treatment, thereby allowing for production of TFTs and/or other electronic devices on the glass substrate without significant deterioration of display characteristics.

An example soda-lime-silica base glass according to certain embodiments of this invention, on a weight percentage basis, includes the following basic ingredients:

TABLE 1

| Example Base Glass | |
|---|---|
| Ingredient | Wt. % |
| $SiO_2$ | 67-75% |
| $Na_2O$ | 10-20% |
| CaO | 5-15% |
| MgO | 0-7% |
| $Al_2O_3$ | 0-7% |
| $K_2O$ | 0-7% |

Other minor ingredients, including various refining aids, such as salt cake, crystalline water and/or the like may also be included in the base glass. In certain embodiments, for example, glass herein may be made from batch raw materials silica sand, soda ash, dolomite, limestone, with the use of salt cake ($SO_3$) as a refining agent (or of course boron oxide as discussed above). Reducing and oxidizing agent(s) may also be used in certain instances. In certain instances, soda-lime-silica base glasses herein include by weight from about 10-15% $Na_2O$ and from about 6-12% CaO. In addition to the base glass materials discussed above, the glass batch and/or final glass may include a colorant portion including material(s) such as iron, erbium, cobalt, selenium and/or the like. In certain example embodiments of this invention, the amount of total iron in the glass may be from about 0.05 to 1.2%, more preferably from about 0.3 to 0.8%. In the case of certain clear high transmission glasses, the total iron may be from about 0.005 to 0.025%. The total amount of iron present in the glass, and thus in the colorant portion thereof, is expressed herein in terms of $Fe_2O_3$ in accordance with standard practice. This, however, does not imply that all iron is actually in the form of $Fe_2O_3$. Likewise, the amount of iron in the ferrous state is reported herein as FeO, even though all ferrous state iron in the glass may not be in the form of FeO.

Techniques to block or greatly reduce sodium migration include surface treatment with $AlCl_3$ at high temperature(s).

Consider the following chemical reaction for example: $AlCl_3+Na^++H_2O \rightarrow Al_3+NaCl+HCl$ (e.g., non-stoichiometric). The $Al_3(+)$ gets integrated in the glass network and stabilizes them possibly as an Albite-like phase→$Na[AlSi_3O_8]$. A Mullite phase, $3Al_2O_3 \times 2SiO_2$ may be even more stable. In certain example embodiments, Albite and Mullite phases may be caused to coexist in the glass network of the glass substrate.

In certain example embodiments an aluminum oxide (e.g., $Al_2O_3$) layer is formed at the surface of the glass substrate. The reaction of the float glass with $AlCl_3$ may be performed as follows in certain instances. $AlCl_3$ vapor may be provided at or proximate the exit of the tin bath in the float line, and/or $AlCl_3$/ethanol (or methanol instead of or in addition to ethanol) mixture may be sprayed directly onto the hot glass ribbon at or proximate the exit of the tin bath. Thus, the treatment may be performed at or just prior to the annealing lehr in the float glass manufacturing process.

FIG. 1 is a schematic diagram of a method of making glass using the float process according to an example embodiment of this invention. The glass batch raw materials (e.g., silica sand, soda ash, dolomite, limestone, etc.) are provided in and heated in a furnace or melter 1 to form a glass melt. The glass melt is poured onto a bath of molten material such as tin (tin bath) at stage 3, where the glass melt is formed and continuously cooled to form a float glass ribbon. The float glass ribbon proceeds toward the annealing lehr 5 for slow cooling. Optionally, prior to entering the annealing lehr 5, lateral edge portion(s) of the glass sheet may be trimmed in a hot condition. The glass sheet typically reaches the beginning of the annealing lehr at a temperatures of at least about 540 degrees C., more preferably at least about 580 degrees C., with a possible range from about 540 (or 580) to 800 degrees C. During the annealing, the temperature of the glass sheet strip is slowly cooled from the annealing point (e.g., from about 538-560 degrees C.) to a strain point of from about 495-560 degrees C., which may be referred to as an annealing range. While these temperature ranges are preferred for annealing, different temperatures may be used in certain instances. The continuous glass sheet may be supported by either rollers or gas during annealing in different embodiments of this invention.

After annealing at 5, the continuous glass sheet is moved on for further processing at 7 such as one or more of cutting, cooling, coating and/or the like. In certain example embodiments, after the aluminum chloride treating 10 of a first major surface of the glass, the glass is subjected during processing 7 to polishing down a second major surface of the glass opposite to the first major surface that was subjected to said treating, in order to reduce a thickness of the glass for use in display applications. For example, a starting surface treated glass substrate with a thickness of from about 1.3 to 1.8 mm (e.g., from about 1-5-1.7 mm, or about 1.6 mm) may be polished down to a glass thickness of from about 0.6-1.2 mm (more preferably from about 0.7-1.1 mm) for certain display applications such as LCDs, OLEDs, PDPs, or the like. As another example, a glass substrate starting with a thickness of 1.1 mm may be polished down to a 0.7 m thickness. The post-treatment polishing is performed on the surface of the glass opposite the surface that was treated with the aluminum chloride, so as to not disturb the Al content at the treated surface of the glass.

In certain example embodiments of this invention, a major surface(s) of the glass (e.g., the upper surface of the glass which is opposite the molten bath) is treated with aluminum chloride (e.g., $AlCl_3$ or some other stoichiometry) at or just prior to the annealing lehr 5. As shown in FIG. 1, in the float process, the annealing lehr 5 is located after the molten bath (e.g., tin bath) 3 where the glass floats on the molten bath. The aluminum chloride treatment 10 at or just prior to the annealing lehr 5 is advantageous in that it allows the treatment 10 to be performed at a desirable glass temperature and permits exhaust functions in or proximate the annealing lehr to remove byproducts of the treatment in an efficient manner. Thus, additional exhaust steps following the lehr may be avoided in certain example non-limiting situations, as may aluminum treatment steps with corresponding heating following the lehr.

In the aluminum chloride treatment 10, $AlCl_3$ may provided in a solvent such as an alcohol. In certain example embodiments, $AlCl_3$ is provided in a solvent such as methanol, or the like. Instead of or in addition to methanol, ethanol, isopropyl alcohol, water, or the like may instead be used as a solvent in which the aluminum chloride is provided. For example, the aluminum chloride treatment may be of or include $AlCl_3 \times 6H_2O$ or the like in certain example instances. The mixture of $AlCl_3$ and solvent(s) may be applied to the major surface(s) of the glass in any suitable manner. For example, in certain example embodiments, the mixture of $AlCl_3$ and solvent(s) may be sprayed by a gas/air burner(s) located above the glass strip toward the major glass surface in order to apply the treatment (e.g., via combustion CVD or CCVD). The mixture of $AlCl_3$ and solvent(s) may be applied to the burner in either liquid or gas phase. Alternatively, the mixture of $AlCl_3$ and solvent(s) may be applied to the glass surface during the treatment 10 by spraying in liquid form, or by evaporating it onto the major glass surface(s). In the annealing lehr where excess oxygen is plentiful, the solvent quickly burns off and can be removed via exhaust port(s) of the lehr.

An example purpose of applying the $AlCl_3$ to the major surface(s) (e.g., top surface) of the glass is to reduce sodium or other alkali leaching from the glass. The $AlCl_3$ on the surface of the glass creases a chemical reaction between the Cl (from the $AlCl_3$) and alkali element(s) (e.g., Na and/or K) and/or alkaline earth element(s) (e.g., Ca and/or Mg) in the glass. For example, $Na_2O$ of the glass matrix reacts with $Cl_2$ from the $AlCl_3$ to form NaCl (NaCl→Na+Cl), and the oxygen may be removed as an oxychloride or the like; moreover, HCl and/or $H_2O$ can be removed in vapor form. In a similar manner, $K_2O$ of the glass matrix reacts with $Cl_2$ (from the $AlCl_3$) to form KCl. As another example, CaO of the glass reacts with $Cl_2$ (from the $AlCl_3$) to form $CaCl_2$. Again, the HCl is burned off and can be removed by exhaust port(s) at or near the lehr. Accordingly, it will be appreciated that treatment of the glass surface with aluminum chloride such as $AlCl_3$ is an efficient technique for removing or reducing alkali and alkaline earth elements from the surface area of the glass to some depth into the glass, thereby reducing the ability of alkali and/or alkaline earth element(s) to leach out of the glass and stain the surface thereof and/or damage a coating thereon (e.g., during heat treatment such as thermal tempering). Thus, the surface portion of the glass ends up having a lesser amount of alkali and/or alkaline earth elements (and more $Al_2O_3$ and $SiO_2$) than does the rest of the glass sheet such as toward the middle of the sheet, thereby improving durability of the glass and improving stain resistance thereof.

Moreover, the aluminum from the aluminum chloride tends to become incorporated into the glass surface area, bonding with elements of the glass matrix. This is advantageous in that when soda from the glass reacts with the Cl it leaves dangling oxygen bonds in the glass matrix, and the aluminum can react with these dangling oxygen bonds thereby strengthening the glass network and improving strength/durability. Si and Al in the glass may also bond through the oxygens in the glass, and may form an albite structure at the surface in certain example instances. Thus, a surface area of the glass is rich in Al and Si, thereby improving strength and durability of the glass.

As noted above, in the aluminum chloride treatment 10, $AlCl_3$ may provided in a solvent such as an alcohol (e.g., methanol) so make up the mixture. It is possible that the aluminum chloride may also be provided in water in certain instances to make up the mixture. The mixture is preferably from about 1-25% $AlCl_3$ (more preferably from about 2-20%, even more preferably from about 3-15%, and most preferably from about 5-10% $AlCl_3$), with the remainder being made up of solvent or water in certain example embodiments of this invention. The weight ratio of solvent:$AlCl_3$ in the mixture is preferably from about 1:8 to 1:40, more preferably from about 1:10 to 1:20 (where methanol is an example solvent). It has been found that these ratios provide the best results for application and treatment.

It has been found that the glass temperature range at which the aluminum chloride treatment is applied is important. In particular, the glass has to be hot enough to accept the treatment and promote good reaction of the aluminum chloride with elements of the glass, but must be cool enough so that corrosive byproducts of the treatment such as HCl do not cause significant damage to the manufacturing components or the glass itself. It has been found that it is desirable to apply the aluminum chloride to the glass surface during treatment 10 when the glass is at a temperature of from about 550 degrees C. to 900 degrees C., more preferably from about 580 degrees C. to 850 degrees C., and most preferably from about 590 degrees C. to 800 degrees C.

In pattern-glass lines, the aluminum chloride treatment 10 is still performed at or just before the annealing lehr for the advantageous reasons discussed herein. However, there is no tin bath in a pattern-line, and instead the glass may be formed by one or more rollers as described in U.S. Pat. No. 6,796,146, the disclosures of which is hereby incorporated herein by reference.

Figure 2:
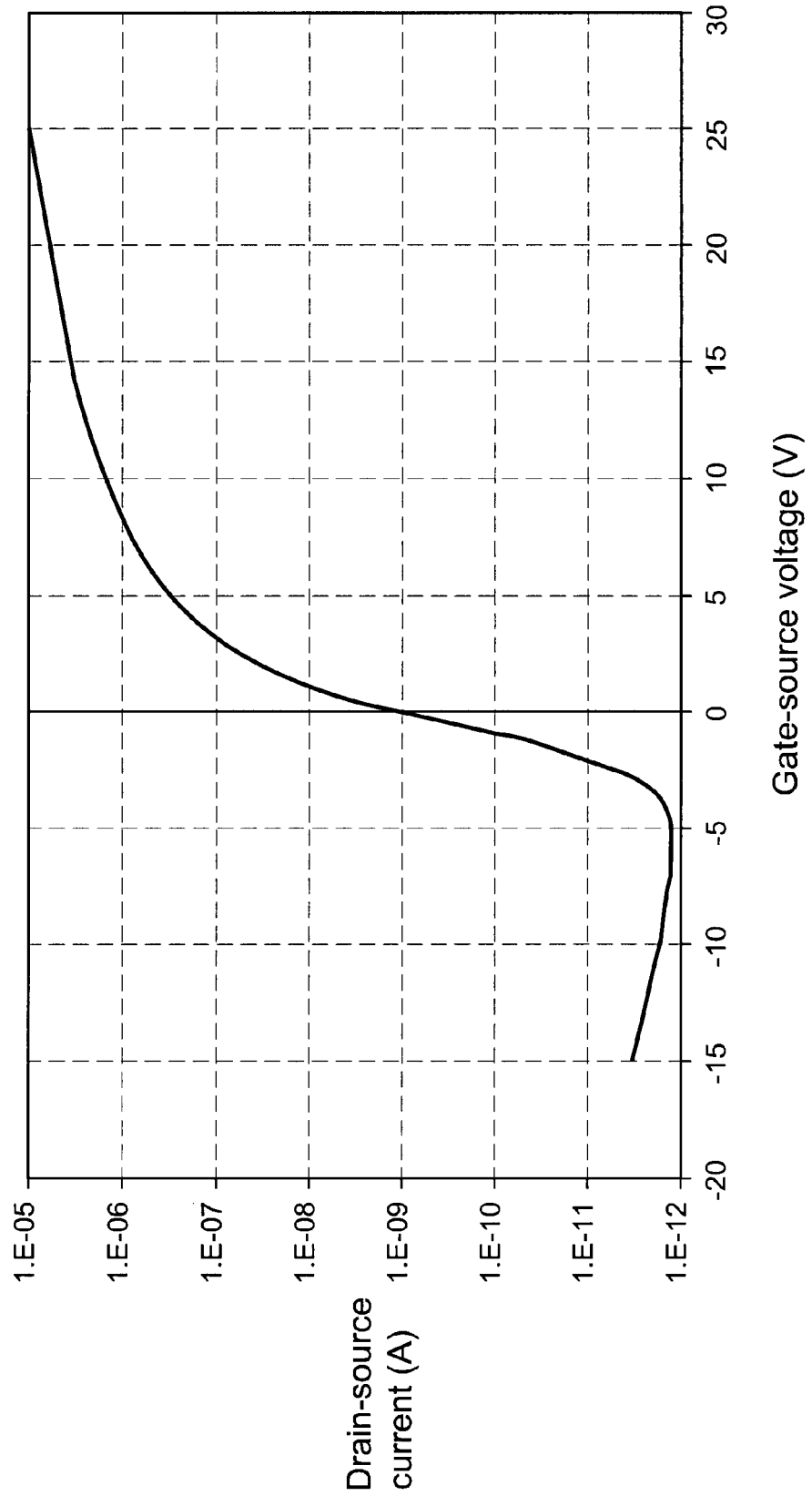
FIG. 2 is a gate-source voltage (V) vs. drain-source current (A) graph illustrating characteristics of a-Si TFTs on soda-lime-silica based float glass made in accordance with an example embodiment of this invention.

Amorphous silicon TFTs were produced on a soda-lime-silica glass surface treated in accordance with this invention, and the characteristics thereof are shown in FIG. 2. In particular, FIG. 2 is a gate-source voltage (V) vs. drain-source current (A) graph illustrating characteristics of a-Si TFTs on soda-lime-silica based float glass made in accordance with an example embodiment of this invention. The TFTs were characterized by a channel width/length ratio of 50 μm/10 μm, source-drain voltage=10V. The resulting measurements evidence TFT characteristics, including field effect mobility, threshold voltage, sub-threshold slope and OFF current that are similar to those obtained on borosilicate glass. The TFTs were subjected to accelerated lifetime tests of 100 hours storage at 200 degrees C.; and only small changes similar to those in TFTs on borosilicate glass were observed. The TFTs were also subjected to bias stress of 2 hours at 30V on the gate; the changes in the threshold voltage and mobility were small and similar to those in TFTs on reference borosilicate glass.

In certain example embodiments of this invention, the CTE of soda lime silica glass may be reduced by one or more of several methods. The glass may be pre-shrunk pre-annealed) at from about 500-550 degrees C., after which the CTE is similar to that of borosilicate glass. Moreover, it may be possible to change the glass composition to address CTE.

Glass described herein may be made in accordance with the glass thickness as produced on the float line. Alternatively, the glass may be polished down to a smaller thickness after the float process and thus after the aluminum chloride treatment for certain display applications. For example, a starting substrate with a thickness of about 1.6 mm may be polished down to about 0.6-1.2 mm (more preferably from about 0.7-1.1 mm) thickness for certain display applications. As another example, a glass substrate starting with a thickness of 1.1 mm may be polished down to a 0.7 m thickness. The post-treatment polishing is performed on the surface of the glass opposite the surface that was treated with the aluminum chloride, so as to not disturb the Al content at the treated surface of the glass.

Once given the above disclosure many other features, modifications and improvements will become apparent to the skilled artisan. Such features, modifications and improvements are therefore considered to be a part of this invention, the scope of which is to be determined by the following claims:

What is claimed is:

1. A method of making soda-lime-silica based glass, the method comprising:
provid ing glass raw materials including sodium, silica, and calcium in a furnace to form a glass melt;
pre-annealing a glass strip formed from the glass melt at a temperature of 500-550 degrees C. in order to alter its coefficient of thermal expansion (CTE);
forwarding the pre-annealed glass strip to an annealing lehr where the glass strip is annealed; and
treating at least a first major surface of the pre-annealed glass strip with aluminum chloride, at or just prior to the annealing lehr, when the glass strip is at a temperature(s) of from about 580 degrees C. to 850 degrees C., in order to make the soda-lime-silica based glass from the pre-annealed glass strip, the annealing lehr supporting an environment having an excess of oxygen.

2. The method of claim 1, wherein said treating comprises applying a mixture of aluminum chloride and at least one solvent to the surface of the glass strip, wherein a weight ratio of solvent to aluminum chloride in the mixture is from about 1:8 to 1:40.

3. The method of claim 1, wherein said treating comprises applying a mixture of aluminum chloride and at least one solvent to the surface of the glass strip, wherein a weight ratio of solvent to aluminum chloride in the mixture is from about 1:10 to 1:20.

4. The method of claim 1, wherein said treating comprises applying a mixture of $AlCl_3$ and at least one solvent to the surface of the glass strip, wherein the mixture is from about 1-25% $AlCl_3$.

5. The method of claim 4, wherein the solvent comprises one or more of methanol, ethanol, and isopropyl alcohol.

6. The method of claim 1, wherein said treating comprises applying a mixture of $AlCl_3$ and at least one solvent to the surface of the glass strip, wherein the mixture is from about 2-20% $AlCl_3$.

7. The method of claim 1, wherein said treating comprises applying a mixture of $AlCl_3$ and at least one solvent to the surface of the glass strip, wherein the mixture is from about 3-15% $AlCl_3$.

8. The method of claim 1, further comprising: after said treating of the first major surface, polishing down a second major surface of the glass opposite to the first major surface that was subjected to said treating, in order to reduce a thickness of the glass for use in display applications.

9. The method of claim 8, wherein said polishing comprises thinning down a glass substrate from a starting thickness of from about 1.3 to 1.8 mm to a finished thickness of from about 0.6-1.2 mm.

* * * * *